United States Patent
Kawai

(10) Patent No.: US 8,475,907 B2
(45) Date of Patent: Jul. 2, 2013

(54) SILICON CARBIDE-BASED POROUS BODY

(75) Inventor: Masaaki Kawai, Nishikasugai-county (JP)

(73) Assignee: NGK Insulators, Ltd., Nagoya (JP)

( * ) Notice: Subject to any disclaimer, the term of this patent is extended or adjusted under 35 U.S.C. 154(b) by 1066 days.

(21) Appl. No.: 12/329,846

(22) Filed: Dec. 8, 2008

(65) Prior Publication Data

US 2009/0155528 A1 Jun. 18, 2009

(30) Foreign Application Priority Data

Dec. 13, 2007 (JP) ................................. 2007-322438

(51) Int. Cl.
*C04B 35/56* (2006.01)

(52) U.S. Cl.
USPC ................ 428/116; 264/628; 501/88; 501/92

(58) Field of Classification Search
USPC .................... 264/628; 428/116, 34.4; 501/88, 501/92; 55/523, 524
See application file for complete search history.

(56) References Cited

U.S. PATENT DOCUMENTS

| | | | | |
|---|---|---|---|---|
| 6,770,856 | B2 * | 8/2004 | Gnesin et al. ................. | 219/548 |
| 6,777,114 | B2 * | 8/2004 | Tomita et al. ................. | 428/698 |
| 6,815,038 | B2 * | 11/2004 | Morimoto et al. ............ | 428/116 |
| 7,011,803 | B2 * | 3/2006 | Ichikawa et al. .............. | 423/345 |
| 7,029,511 | B2 * | 4/2006 | Ichikawa et al. .............. | 501/88 |
| 7,037,477 | B2 * | 5/2006 | Tomita et al. ................. | 423/345 |
| 7,867,313 | B2 * | 1/2011 | Travitzky et al. ............. | 55/524 |
| 2003/0134084 | A1 | 7/2003 | Ichikawa et al. | |
| 2007/0032370 | A1 * | 2/2007 | Weisensel et al. ............. | 501/88 |

FOREIGN PATENT DOCUMENTS

| | | |
|---|---|---|
| EP | 1 260 882 A2 | 11/2002 |
| EP | 1 277 714 A1 | 1/2003 |
| EP | 1 375 454 A1 | 1/2004 |
| EP | 1 703 095 A1 | 9/2006 |
| JP | 05-017227 * | 1/1993 |
| JP | A-07-330462 | 12/1995 |
| JP | A-2002-201082 | 7/2002 |

OTHER PUBLICATIONS

European Search Report issued in Application No. 08 25 3936.2; Dated Dec. 23, 2010.
Jun. 8, 2012 Office Action issued in European Application No. 08 253 936.2.

* cited by examiner

*Primary Examiner* — Archene Turner
(74) *Attorney, Agent, or Firm* — Oliff & Berridge, PLC

(57) ABSTRACT

There is provided a silicon carbide-based porous body which can avoid excessive temperature elevation when it is used as a filter and the captured particulate matter (PM) is burnt for removal and which is low in strength reduction caused by heat cycle. The silicon carbide-based porous body comprises a plurality of silicon carbide (SiC) particles as an aggregate and a plurality of binding phases which bind the silicon carbide particles to each other, wherein of the binding phases, the phase having the largest volume is either of a Si phase and a phase (a metal silicide phase) made of at least one member selected from the group consisting of a Ti silicide, a Zr silicide, a Mo silicide and a W silicide, all having a linear thermal expansion coefficient at 40 to 800° C., higher than that of Si by at least $3 \times 10^{-6}$ (° C.$^{-1}$) and the phase having the next largest volume is the remainder of the Si phase and the metal silicide phase, and the binding phases contain the Si phase by 20 to 80% by volume of the total binding phases.

17 Claims, No Drawings

SILICON CARBIDE-BASED POROUS BODY

BACKGROUND OF THE INVENTION AND RELATED ART STATEMENT

The present invention relates to a silicon carbide-based porous body. More particularly, the present invention relates to a silicon carbide-based porous body which can avoid excessive temperature elevation when it is used as a filter and the captured particulate matter (PM) is burnt for removal and which is low in strength reduction caused by heat cycle.

BACKGROUND ART

Particulate matter (PM) such as soot and the like is contained in chimney gas and diesel exhaust gas and has caused air pollution. In order to remove it, there is in wide use a filter (a diesel particulate filter, i.e. a DPF) made of, for example, a silicon carbide-based porous body having excellent heat resistance and fire resistance. Ordinarily, the DPF has porous partition walls which form, by surrounding, a plurality of cells (which act as a fluid passage) and, in the DPF, there are alternately provided given cells which are each open in one end and plugged in other end and residual cells which are each plugged in one end and open in other end. A fluid (an exhaust gas) which has entered into the DPF from the open one end of each given cell, is allowed to pass through partition walls and enter into each residual cell, and is discharged from the open other end of each residual cell; thereby, the PM in the exhaust gas is captured and removed. The DPF comes to have a lower ability for exhaust gas treatment when the PM is accumulated inside; therefore, the DPF is ordinarily used while the accumulated PM is burnt and removed as necessary by heating or the like, to return the DPF to a condition of high treatment ability.

As the silicon carbide-based porous material used as the material for DPF, there is being preferably used one formed by binding silicon carbide particles (an aggregate) with silicon (a binder) (see, for example, Patent Literature 1). With this porous material, there has been a problem that the DPF made thereof causes excessive temperature elevation in burning and removal of PM.

Patent Literature 1: JP-A-2002-201082

The excessive temperature elevation of DPF in burning and removal of PM is considered to be caused by the small heat capacity of silicon used as a binder. Meanwhile, use of a metal silicide of large heat capacity as a binder is considered; however, the metal silicide has not only a large heat capacity but also a large thermal expansion coefficient and therefore there has been a problem that the DPF using a metal silicide may cause a reduction in strength owing to the heat cycle thereof.

The present invention has been made in view of the above-mentioned problems. The present invention aims at providing a silicon carbide-based porous body which can avoid excessive temperature elevation when it is used as a filter and the captured particulate matter (PM) is burnt for removal and which is low in strength reduction caused by heat cycle.

SUMMARY OF THE INVENTION

In order to achieve the above aim, the present invention provides a silicon carbide-based porous body described below.

[1] A silicon carbide-based porous body comprising a plurality of silicon carbide (SiC) particles as an aggregate and a plurality of binding phases which bind the silicon carbide particles to each other, wherein of the binding phases, the crystal phase having the largest volume is either of a Si phase and a phase made of at least one member selected from the group consisting of a Ti silicide, a Zr silicide, a Mo silicide and a W silicide, all having a linear thermal expansion coefficient at 40 to 800° C., higher than that of Si by at least $3\times10^{-6}$ (° $C.^{-1}$) and the crystal phase having the next largest volume is the remainder of the Si phase and the phase made of at least one member selected from the group consisting of a Ti silicide, a Zr silicide, a Mo silicide and a W silicide, all having a linear thermal expansion coefficient at 40 to 800° C., higher than that of Si by at least $3\times10^{-6}$ (° $C.^{-1}$), the content of the binder constituting the binding phases, i.e. [100×binder/(silicon carbide particles+binder)] is 5 to 60% by volume, and the binding phases contain the Si phase by 20 to 80% by volume of the total binding phases.

[2] A silicon carbide-based porous body according to [1], having an open pore ratio of 30 to 75%.

[3] A silicon carbide-based porous body according to [1] or [2], having an average pore diameter of 5 to 50 μm.

[4] A silicon carbide-based porous body according to any of [1] to [3], wherein the silicon carbide particles have an average particle diameter of 5 to 100 μm.

[5] A silicon carbide-based porous body according to any of [1] to [4], wherein the total volume of the Si phase and the phase made of at least one member selected from the group consisting of a Ti silicide, a Zr silicide, a Mo silicide and a W silicide, all having a linear thermal expansion coefficient at 40 to 800° C., higher than that of Si by at least $3\times10^{-6}$ (° $C.^{-1}$) is 70% by volume or more, of the total binding phases.

[6] A silicon carbide-based porous body according to any of [1] to [5], which is a honeycomb structure having porous partition walls forming, by surrounding, a plurality of cells to act as a fluid passage.

[7] A method for producing a silicon carbide-based porous body, which comprises kneading a raw material to be formed, to prepare a puddle, the raw material to be formed containing silicon carbide particles, a binder raw material and a pore former, the binder raw material containing a metal silicide raw material, the metal silicide raw material being (a) a mixture of a silicon powder and at least one member selected from the group consisting of Ti, Zr, Mo and W, (b) at least one member selected from the group consisting of a Ti silicide, a Zr silicide, a Mo silicide and a W silicide, or (c) a mixture of (a) and (b), the content of the binder raw material, i.e. [100×binder raw material/(silicon carbide particles+binder raw material)] is 5 to 70% by volume, and the content of the pore former, i.e. (100×pore former/raw material to be formed) is 25 to 85% by volume, forming the puddle to prepare a formed material, and firing the formed material to obtain a silicon carbide-based porous body wherein of the binding phases formed by the firing, the crystal phase having the largest volume is either of a Si phase and a phase made of at least one member selected from the group consisting of a Ti silicide, a Zr silicide, a Mo silicide and a W silicide, all having a linear thermal expansion coefficient at 40 to 800° C., higher than that of Si by at least $3\times10^{-6}$ (° $C.^{-1}$) and the crystal phase having the next largest volume is the remainder of the Si phase and the phase made of at least one member selected from the group consisting of a Ti silicide, a Zr silicide, a Mo silicide and a W silicide, all having a linear thermal expansion coefficient at 40 to 800° C., higher than that of Si by at least $3\times10^{-6}$ (° $C.^{-1}$), the content of the binder constituting the binding phases, i.e. [100×binder/(silicon carbide particles+binder)] is 5 to 60% by volume, and the binding phases contain the Si phase by 20 to 80% by volume of the total binding phases.

In the silicon carbide-based porous body of the present invention, of the binding phases which bind the silicon carbide particles to each other, the crystal phase having the largest volume is either of "a Si phase" and "a phase made of at least one member selected from the group consisting of a Ti silicide, a Zr silicide, a Mo silicide and a W silicide, all having a linear thermal expansion coefficient at 40 to 800° C., higher than that of Si by at least $3\times10^{-6}$ (° C.$^{-1}$)" and the crystal phase having the next largest volume is the remainder of "the Si phase" and "the phase made of at least one member selected from the group consisting of a Ti silicide, a Zr silicide, a Mo silicide and a W silicide, all having a linear thermal expansion coefficient at 40 to 800° C., higher than that of Si by at least $3\times10^{-6}$ (° C.$^{-1}$)", and the binding phases contain the Si phase by 20 to 80% by volume of the total binding phases. Therefore, the binding phases have a large heat capacity and accordingly the silicon carbide-based porous body has, as a whole, a large heat capacity; thereby, the silicon carbide-based porous body can avoid excessive temperature elevation when the captured particulate matter (PM) is burnt and removed, and the strength reduction caused by heat recycle (sudden temperature change) can be suppressed. That is, since the binding phases are a composite phase between a metal silicide having a large heat capacity and a large thermal expansion coefficient and Si having a small thermal expansion coefficient, both the temperature elevation of DPF in burning and removal of PM and the strength reduction of DPF caused by heat cycle can be suppressed.

DESCRIPTION OF THE PREFERRED EMBODIMENTS

Next, embodiments of the present invention are described in detail. However, the present invention is not restricted to the following embodiments, and it should be construed that appropriate design changes, improvements, etc. may be added thereto based on the ordinary knowledge possessed by those skilled in the art, as long as there is no deviation from the gist of the present invention.

(1) Silicon Carbide-Based Porous Body

An embodiment of the silicon carbide-based porous body of the present invention comprises a plurality of silicon carbide (SiC) particles as an aggregate and a plurality of binding phases which bind the silicon carbide particles to each other, wherein of the binding phases, the crystal phase having the largest volume is either of "a Si phase" and "a phase made of at least one member selected from the group consisting of a Ti (titanium) silicide, a Zr (zirconium) silicide, a Mo (molybdenum) silicide and a W (tungsten) silicide, all having a linear thermal expansion coefficient at 40 to 800° C., higher than that of Si by at least $3\times10^{-6}$ (° C.$^{-1}$)" (hereinafter, this phase may be referred to as "metal silicide phase") and the crystal phase having the next largest volume is the remainder of "the Si phase" and "the metal silicide phase", the content of the binder constituting the binding phases, i.e. [100×binder/(silicon carbide particles+binder)] is 5 to 60% by volume, and the binding phases contain the Si phase by 20 to 80% by volume of the total binding phases.

In the silicon carbide-based porous body of the present embodiment, the metal silicide phase is a crystal phase having the largest volume or the second largest volume, of the binding phases; therefore, the silicon carbide-based porous body has, as a whole, a high heat capacity owing to the high heat capacity of the metal silicide phase and accordingly can avoid excessive temperature elevation when the particulate matter (PM) captured therein is burnt and removed. Here, the heat capacity of the Ti silicide (TiSi$_2$) is 3.6 J/cm$^3$·K, the heat capacity of the Mo silicide (MoSi$_2$) is 3.2 J/cm$^3$·K, the heat capacity of the W silicide (Wsi$_2$) is 3.1 J/cm$^3$·K, and the heat capacity of Si is 2.1 J/cm$^3$·K, all at 900 K. Further, the Si phase is a crystal phase having the largest volume or the second largest volume, of the binding phases, and the binding phases contain the Si phase by 20 to 80% by volume of the total binding phases; therefore, the difference in linear thermal expansion coefficient between the silicon carbide particles and the Si, generation of large thermal stress is unlikely in heat cycle, and the strength reduction in heat cycle can be minimized.

The linear thermal expansion coefficient of the metal silicide phase at 40 to 800° C. is higher than the linear thermal expansion coefficient of Si at 40 to 800° C. by at least $3\times10^{-6}$ (° C.$^{-1}$). Ordinarily, the linear thermal expansion coefficient of the metal silicide at 40 to 800° C. is not smaller than "a value larger than the linear thermal expansion coefficient of Si at 40 to 800° C. by $3\times10^{-6}$ (° C.$^{-1}$)". Specifically, the linear thermal expansion coefficient of Si at 40 to 800° C. is $5\times10^{-6}$ (° C.$^{-1}$), the linear thermal expansion coefficient of Ti silicide (TiSi$_2$) at 40 to 800° C. is $11\times10^{-6}$ (° C.$^{-1}$), the linear thermal expansion coefficient of Zr silicide (ZrSi$_2$) at 40 to 800° C. is $9\times10^{-6}$ (° C.$^{-1}$), the linear thermal expansion coefficient of Mo silicide (MoSi$_2$) at 40 to 800° C. is $9\times10^{-6}$ (° C.$^{-1}$), and the linear thermal expansion coefficient of W silicide (WSi$_2$) at 40 to 800° C. is $9\times10^{-6}$ (° C.$^{-1}$). Also, the linear thermal expansion coefficient of silicon carbide at 40 to 800° C. is $5\times10^{-6}$ (° C.$^{-1}$).

The metal silicide phase is a phase made of at least one member selected from the group consisting of the Ti silicide, the Zr silicide, the Mo silicide and the W silicide, all having the above-mentioned particular thermal expansion coefficient; however, it is preferably a phase made of the Ti silicide. A phase made of the Ti silicide is advantageous because it can show the highest heat capacity.

In the binding phases constituting the silicon carbide-based porous body of the present embodiment, either one of the Si phase and the metal silicide phase is a crystal phase having the largest volume and the other is a crystal phase having the next largest volume. The crystal phase having the largest volume, of the binding phases may be the Si phase or the metal silicide phase, but is preferably the metal silicide phase. The presence of the metal silicide phase in the largest volume in the binding phases is advantageous because a higher heat capacity can be achieved.

The binding phases contain the Si phase by 20 to 80% by volume of the total binding phases, preferably by 25 to 70% by volume, more preferably by 30 to 60% by volume. Since the binding phases contain the Si phase in such a range, the strength reduction caused by heat cycle can be suppressed. Further, the total of the Si phase and the metal silicide phase, contained in the binding phases is preferably 70% by volume or more, more preferably 90% by volume or more of the total binding phases. Since the total of the Si phase and the metal silicide phase, contained in the binding phases is in such a range, the binding phases have a high heat capacity and accordingly the silicon carbide-based porous body has, as a whole, a high heat capacity; thereby, excessive temperature elevation when the captured particulate matter (PM) is burnt and removed, can be avoided and the strength reduction caused by heat cycle can be minimized.

As the components other than the silicon (Si) and the metal silicide, contained in the binding phases, there can be mentioned, for example, metal oxides (e.g. silicon dioxide and aluminum oxide). These substances form other phases in the binding phases. The content of the components other than the silicon (Si) and the metal silicide, in the binding phases is preferably 30% by volume or less, more preferably 10% by volume or less of the total binding phases.

The content of the binder constituting the binding phases, i.e. [100×binder/(silicon carbide particles+binder)] is 5 to 60% by volume, preferably 10 to 50, more preferably 15 to 40. A content of the binder of less than 5% by volume is not preferred because the silicon carbide particles can not be bound sufficiently to each other and the strength of the silicon carbide-based porous body obtained is low. A content of the binder of more than 60% by volume is not preferred because the porosity of the silicon carbide-based porous body obtained is low and the pressure loss thereof is high. The content of the binder is a calculation value obtained by conducting X-ray diffraction measurement for a ground silicon carbide-based porous body.

The silicon carbide particles constituting the silicon carbide-based porous body of the present embodiment has an average particle diameter of preferably 5 to 100 μm. With such an average particle, there is an advantage that a porosity and a pore diameter both preferable for the filter to be produced are easily obtained. An average particle diameter of less than 5 μm results in too small a pore diameter, and an average particle diameter of more than 100 μm results in too small a porosity. The average particle diameter is a value obtained by measurement based on JIS R 1629. The silicon carbide particles are contained preferably by 40 to 95% by volume of the silicon carbide-based porous body, more preferably by 50 to 85% by volume. Incidentally, the average particle diameter of the silicon carbide particles is the average particle diameter of raw material silicon carbide particles.

As to the heat capacity of the whole silicon carbide-based porous body of the present embodiment, there is no restriction because the preferred range of the heat capacity differs depending upon the design of the filter to be produced. However, in a case containing the binder in an amount of 40%, the heat capacity of the whole porous body at 900 K is preferably 3.2 J/cm$^3$·K or more. When the heat capacity of the whole silicon carbide-based porous body is in such a range, the silicon carbide-based porous body can avoid excessive temperature elevation when the particulate matter (PM) captured therein is burnt and removed. When the heat capacity of the whole silicon carbide-based porous body is smaller than 3.2 J/cm$^3$·K, the silicon carbide-based porous body may be unable to avoid excessive temperature elevation when the particulate matter (PM) captured therein is burnt and removed. The heat capacity is a value calculated from a specific heat obtained by the DSC method and the density obtained using a dry automatic densitometer (Accupyc 1330, a product of Shimadzu Corporation).

The silicon carbide-based porous body of the present embodiment has an open pore ratio of preferably 30 to 75%, more preferably 40 to 65%. When the open pore ratio is in such a range, there is an advantage that the porous body maintains a required strength and yet can show a small pressure loss. An open pore ratio of less than 30% may result in an increased pressure loss, and an open pore ratio of more than 75% may result in a reduced strength. The open pore ratio is a value obtained by measurement by the Archimedes method.

The silicon carbide-based porous body of the present embodiment has an average pore diameter of preferably 5 to 50 μm, more preferably 7 to 35 μm. When the average pore diameter is in such a range, there is an advantage that particulate matter (PM) can be captured effectively. An average pore diameter of less than 5 μm is not preferred because plugging takes place easily owing to the particulate matter (PM) captured. An average pore diameter of more than 50 μm is not preferred because particulate matter (PM) may pass through the filter made of the porous body, without being captured. The average pore diameter is a value obtained by measurement using a mercury porosimeter.

The silicon carbide-based porous body of the present embodiment has a thermal conductivity at 600° C., of preferably 10 W/mK or more, more preferably 11 W/mK or more. When the thermal conductivity is in such a range, there is an advantage that the excessive temperature elevation when the particulate matter (PM) captured is burnt and removed, can be suppressed. A thermal conductivity of less than 10 W/mK may invite excessive temperature elevation. The thermal conductivity is a value obtained by measurement based on JIS R 1611.

The silicon carbide-based porous body of the present embodiment is preferably a honeycomb structure having porous partition walls which form, by surrounding, a plurality of cells to act as a fluid passage. When the cell ends of the honeycomb structure are plugged in a predetermined pattern to produce a DPF, the DPF has a high heat capacity and can avoid excessive temperature elevation when the particulate matter (PM) captured thereby is burnt and removed.

When the silicon carbide-based porous body of the present invention is a honeycomb structure, there is no particular restriction as to the shape of the honeycomb structure. For example, the shape of the section perpendicular to the central axis of the columnar structure of the honeycomb structure, i.e. the shape of the honeycomb structure bottom includes a polygon (e.g. a tetragon), a circle, an oval, an oblong circle, a modified shape, etc. The size thereof is not particularly restricted; however, the length of the central axis direction is preferably about 70 to 500 mm. When the shape of honeycomb structure bottom is, for example, a square, each side thereof is preferably about 30 to 100 mm. There is no particular restriction as to the cell shape of the honeycomb structure, i.e. the cell shape in the honeycomb structure section perpendicular to the honeycomb structure central axis direction (the direction in which each cell extends); and the cell shape includes, for example, a triangle, a tetragon, a hexagon, an octagon, a circle and a combination thereof. As the means for increasing the heat capacity of each plugging portion, there can be mentioned use of a material of plugging portions of higher heat capacity and enlargement of the volume of each plugging portion. For example, by employing a combination of octagon cells and tetragon cells and plugging the tetragon cells at the gas inlet side and the octagon cells at the gas outlet side, the volume of the plugging portions at the gas outlet side becomes larger than the volume of the plugging portions at the gas inlet side. The thickness of each partition wall of the honeycomb structure is preferably 50 to 2,000 μm. A partition wall thickness of less than 50 μm may result in the reduced strength of the honeycomb structure, and a partition wall thickness of more than 2,000 μm may result in an increased pressure loss. The cell density of the honeycomb structure is not particularly restricted, but is preferably 0.9 to 311 cells/cm$^2$, more preferably 7.8 to 62 cells/cm$^2$.

When the honeycomb structure (the silicon carbide-based porous body) is used as a filter, the filter may be one obtained by using the honeycomb structure as a honeycomb segment and bonding a plurality of such honeycomb segments. In this case, the structure of the honeycomb segment is preferably the same as the above-mentioned preferred constitution of the honeycomb structure.

(2) Method for Production of Silicon Carbide-Based Porous Body

The method for producing an embodiment of the silicon carbide-based porous body of the present invention comprises kneading a raw material to be formed, which contains silicon carbide particles, a binder raw material and a pore former, to prepare a puddle, forming the puddle to prepare a formed material, and firing the formed material to obtain a silicon carbide-based porous body. The binder raw material contain a metal silicide raw material, and the metal silicide raw material is (a) a mixture of a silicon powder and at least one member selected from the group consisting of Ti, Zr, Mo and W, (b) at least one member selected from the group consisting of a Ti silicide, a Zr silicide, a Mo silicide and a W silicide, or (c) a mixture of (a) and (b). In the method for producing the silicon carbide-based porous body of the present embodiment, the content of the binder raw material, i.e. [100×binder raw material/(silicon carbide particles+binder raw material)] is 5 to 70% by volume; the content of the pore former, i.e. (100×pore former/raw material to be formed) is 25 to 85% by volume; and there is obtained a silicon carbide-based porous body wherein of the binding phases formed by the firing, the phase having the largest volume is either of a Si phase and a phase made of at least one member selected from the group consisting of a Ti silicide, a Zr silicide, a Mo silicide and a W silicide, all having a linear thermal expansion coefficient at 40 to 800° C., higher than that of Si by at least $3 \times 10^{-6}$ (° C.$^{-1}$) and the phase having the next largest volume is the remainder of the Si phase and the phase made of at least one member selected from the group consisting of a Ti silicide, a Zr silicide, a Mo silicide and a W silicide, all having a linear thermal expansion coefficient at 40 to 800° C., higher than that of Si by at least $3 \times 10^{-6}$ (° C.$^{-1}$), and the binding phases formed by the firing contain the Si phase by 20 to 80% by volume of the total binding phases. Here, the binder raw material forms the binding phases in the silicon carbide-based porous body obtained, and the Si of the binder raw material forms the Si phase and the metal silicide raw material of the binder raw material forms the metal silicide phase.

In the method for producing the silicon carbide-based porous body of the present embodiment, first, the raw material to be formed, containing silicon carbide particles and a binder raw material is kneaded to prepare a puddle. The raw material to be formed is preferably prepared by mixing silicon carbide particles, a binder raw material and, as necessary, other raw materials. The binder raw material contains silicon (Si) and a metal silicide raw material; of the binder raw material, the raw material contained in the largest amount is either of Si and the metal silicide raw material and the raw material contained in the second largest amount is the remainder of the Si and the metal silicide raw material. In the present embodiment, the metal silicide raw material has a linear thermal expansion coefficient at 40 to 800° C., higher than that of Si by at least $3 \times 10^{-6}$° C.$^{-1}$).

The metal silicide raw material is preferably (a) a mixture of a silicon powder and at least one member selected from the group consisting of Ti, Zr, Mo and W, (b) at least one member selected from the group consisting of a Ti silicide, a Mo silicide and a W silicide, or (c) "a mixture of (a) and (b)". Of these, (a) is more preferable. When (a) is used as the metal silicide raw material, the silicon powder and the at least one member selected from the group consisting of Ti, Zr, Mo and W react with each other during firing, to become a metal silicide and bind silicon carbide particles to each other, together with Si. When (b) is used as the metal silicide raw material, the metal silicide (e.g. Ti silicide) per se bind, during firing, silicon carbide particles to each other together with Si. When (c) is used as the metal silicide raw material, the silicon powder reacts, during firing, with the at least one member selected from the group consisting of Ti, Zr, Mo and W to become a metal silicide and this metal silicide binds silicon carbide particles to each other, together with the metal silicide of (b) and Si.

The binder raw material contained in the raw material to be formed may contain components other than Si and the metal silicide raw material. As the binder raw material components other than Si and the metal silicide raw material, there can be mentioned metal oxides (e.g. silicon dioxide and aluminum oxide), etc.

Here, the metal silicide raw material refers to a raw material which becomes a metal silicide when fired; and the raw material which remains unreacted after the firing, is not regarded as the metal silicide raw material. For example, in the case of (a), the silicon (Si) contained in the binder raw material is present in excess relative to a metal (e.g. Ti); of the Si contained, the portion which reacts with the metal (e.g. Ti) in firing to become a metal silicide, is a metal silicide raw material, but the portion which remains as Si even after firing, is "Si contained in the binder raw material". The Si contained in the binder raw material is 20 to 80% by volume of the total binder raw material, preferably 25 to 75% by volume, more preferably 30 to 70% by volume. Since Si is contained in the binder raw material in such a range, the strength reduction of the silicon carbide-based porous body obtained, caused by heat cycle can be suppressed. Further, the total of the Si contained in the binder raw material and the metal silicide raw material is preferably 70% by volume or more of the total binder raw material, more preferably 80% by volume or more, particularly preferably 90% by volume or more. Since the total of the Si contained in the binder raw material and the metal silicide raw material is in such a range, the binding phases of the silicon carbide-based porous body obtained has a high heat capacity and accordingly the whole silicon carbide-based porous body has a high heat capacity, whereby the excessive temperature elevation when the particulate material (PM) captured is burnt and removed, can be prevented and also the strength reduction caused by heat cycle can be suppressed.

The content of the binder raw material in the raw material to be formed, i.e. [100×binder raw material/(silicon carbide particles+binder raw material)] is 5 to 60% by volume, preferably 10 to 50% by volume, more preferably 15 to 40% by volume. With a content of the binder raw material of less than 5% by volume, silicon carbide particles can not be bound to each other sufficiently and the silicon carbide-based porous body obtained may have a low strength. With a content of the binder raw material of more than 60% by volume, the silicon carbide-based porous body obtained has a low porosity and may have a high pressure loss.

The silicon carbide particles contained in the raw material to be formed has an average particle diameter of preferably 5 to 100 µm. With such an average particle diameter, there is an advantage that a porosity and a pore diameter both preferable for the filter to be produced are easily obtained. An average particle diameter of less than 5 µm may result in too small a pore diameter, and an average particle diameter of more than 100 µm may result in too small a porosity. Too small a pore diameter tends to incur cell blocking caused by particulate matter (PM), and too small a porosity causes a problem of higher pressure loss. The average particle diameter is a value obtained by measurement based on JIS R 1629. The content of the silicon carbide particles in the raw material to be formed is preferably 40 to 95% by volume, more preferably 50 to 85% by volume.

The raw material to be formed may contain, as other raw materials, a pore former, a forming aid, a surfactant, a dispersant, etc.

The pore former may be a material which vaporizes and disappears in the firing step, and inorganic substances (e.g. coke) and organic substances such as high-molecular compound (e.g. foamed resin), starch and the like can be used singly or in combination. The content of the pore former in the raw material to be formed, i.e. (100×pore former/raw material to be formed) is preferably 25 to 85% by volume. When the content of the pore former is in such a range, the open pore ratio of the silicon carbide-based porous body obtained can be controlled at 30 to 75%. When the content of the pore former is less than 25% by volume, the silicon carbide-based porous body obtained has a low open pore ratio and, when the content is more than 85% by volume, the silicon carbide-based porous body obtained has a high open pore ratio, which may result in a low strength.

As the forming aid, there can be used organic forming aids such as hydroxypropyl methyl cellulose, methyl cellulose, hydroxyethyl cellulose, carboxymethyl cellulose, polyvinyl alcohol and the like. Inorganic forming aids such as montmorillonite and the like can also be used. These forming aids may be used singly or in combination of two or more kinds. The content of the forming aid is preferably 1 to 20% by mass relative to the total raw material to be formed.

Water is used as the dispersant. The content of the dispersant is preferably 5 to 45% by mass relative to the total raw material to be formed.

As the surfactant, there can be used ethylene glycol, dextrin, fatty acid soap, polyalcohol, etc. These may be used singly or in combination of two or more kinds. The content of the surfactant is preferably 0.1 to 5% by mass relative to the total raw material to be formed.

Next, the raw material to be formed is kneaded to prepare a puddle. There is no particular restriction as to the method for kneading the raw material to be formed, to prepare a puddle, and there can be mentioned, for example, a method using a kneader, a vacuum pug mill, or the like.

Then, the puddle is formed to prepare a formed material. As to the method for forming the puddle to prepare a formed material, there is no particular restriction, and there can be used a known forming method such as extrusion, injection, pressing or the like. When there is produced a honeycomb structure having porous partition walls which form, by surrounding, a plurality of cells, a preferred method therefor is a method of extruding a raw material to be formed, by use of a die having a desired cell shape, a desired partition wall thickness and a desired cell density, to prepare a honeycomb formed material. When there is produced a DPF, it is preferred to plug the ends of predetermined cells at one end face of a honeycomb formed material and the ends of residual cells at other end face. The method for plugging the ends is not restricted particularly and a known method can be used.

The formed material obtained is preferably dried prior to firing. The method for drying is not restricted particularly, and there can be used a known drying method such as hot-air drying, microwave drying, dielectric drying, reduced pressure drying, vacuum drying, freeze-drying or the like. Of these, a combined drying method of hot-air drying and microwave drying or dielectric drying is preferred because it enables rapid and uniform drying of whole formed material. The conditions of hot-air drying are preferably 80 to 150° C. and 5 minutes to 2 hours.

Next, the formed material is fired to produce a silicon carbide-based porous body of the present invention. As to the method for firing, there is no particular restriction, and firing can be conducted using an electric furnace, a gas furnace or the like. The conditions of firing are preferably 1,400 to 2,200° C. and 1 to 5 hours in an inert atmosphere such as nitrogen, argon or the like. The open pore ratio of the silicon carbide-based porous body obtained is preferably 30 to 75%, more preferably 40 to 65%. With such a range of open pore ratio, there is an advantage that the pressure loss can be made small while the strength is maintained. The open pore ratio is a value obtained by measurement using the Archimedes method.

The silicon carbide-based porous body obtained has an average pore diameter of preferably 5 to 50 μm, more preferably 7 to 35 μm. With such a range of average pore diameter, there is an advantage that particulate matter (PM) can be captured effectively. The average pore diameter is a value obtained by measurement using a mercury porosimeter.

The silicon carbide-based porous body obtained has a thermal conductivity at 600° C., of preferably 10 W/mK or more, more preferably 11 W/mK or more. With such a range of thermal conductivity, there is an advantage that the excessive temperature elevation when the particulate matter (PM) captured is burnt and removed, can be suppressed.

EXAMPLES

The present invention is described more specifically below by way of Examples. However, the present invention is in no way restricted by these Examples.

Example 1

There were mixed 100 parts by mass of a SiC powder (silicon carbide particles) having an average particle diameter of 35 μm, 25 parts by mass of a metal Si powder and 11 parts by mass of a metal Ti powder. Thereto were added 1 part by mass of a polyvinyl alcohol (an organic forming aid) and 8 parts by mass of water, followed by kneading using a kneader to prepare a plastic puddle. Incidentally, the average particle diameter of the SiC powder was measured based on JIS R 1629, using a particle size distribution tester of laser diffraction type produced by Shimadzu Corporation.

(Preparation of Pellets)

The puddle was subjected to pressing at a pressure of 160 kg/cm$^2$, using a mono-axial pressing machine to obtain unfired pellets of 25 mm×50 mm×6 mm. The pellets were dried at 150° C. for 2 hours using a hot-air dryer, then subjected to organic substance removal at about 450° C. for 5 hours in the air using an air furnace with a deodoring unit, and fired at about 1,450° C. for 2 hours in an Ar inert atmosphere to obtain porous pellets (pellets of silicon carbide-based porous body) in which SiC crystal grains were bound by Si and TiSi$_2$.

The pellets (silicon carbide-based porous body) obtained were measured for strength ratio before and after heat cycle test (strength ratio), component ratio of silicon carbide particles and binder, open pore ratio, and average pore diameter, according to the following methods. The results obtained are shown in Table 1.

There were also measured the linear thermal expansion coefficients of 40 to 800° C., of the Si phase and metal silicide phase constituting the pellets (silicon carbide-based porous body) obtained, according to the following method (thermal expansion measurement). The samples used for measurement of thermal expansion coefficients of Si phase and metal silicide phase were prepared by processing fired pellets.

(Preparation of Plugged Honeycomb Structure)

There were mixed 100 parts by mass of a SiC powder (silicon carbide particles) having an average particle diameter of 35 μm, 25 parts by mass of a metal Si powder and 11 parts by mass of a metal Ti powder. Thereto were added 10 parts by mass of starch and a foamed resin (a pore former), 6 parts by mass of methyl cellulose (an organic forming aid), 2.5 parts by mass of a surfactant and 24 parts by mass of water, followed by kneading using a kneader, to obtain a plastic puddle.

The puddle was subjected to forming using an extruder. The extrudate was subjected to microwave drying, followed by drying at 150° C. for 2 hours using a hot-air dryer, to obtain a honeycomb formed material having a partition wall thickness of 310 μm, a cell density of about 46.5 cells/cm² (300 cells/in.²), a square sectional shape of 35 mm×35 mm and a length of 152 mm.

For the honeycomb formed material obtained, either end of each cell was plugged so that cells were plugged alternately at each end face of the formed material and each end face looked checkerwise. As the filler for plugging, the same material as used for the honeycomb formed material was used.

The plugged honeycomb formed material was dried at 150° C. for 2 hours using a hot-air dryer, then subjected to organic substance removal at about 450° C. for 5 hours in the air using an air furnace with a deodoring unit, and fired at about 1,450° C. for 2 hours in an Ar inert atmosphere to obtain a plugged porous honeycomb segment (a silicon carbide-based porous body) in which SiC crystal grains were bound by $TiSi_2$. This honeycomb segment had the same crystal phases, porosity and average pore diameter as the pellets had.

A plurality of such honeycomb segments were bonded using a bonding material which was made of the same material as for the honeycomb segment but had a lower viscosity than the material. The bonded honeycomb segments were dried at 150° C. for 2 hours using a hot-air dryer, then heat-treated at 700° C. for 1 hour in a nitrogen atmosphere, and processed to obtain a columnar honeycomb structure of 144 mm (diameter)×153 mm (height).

The plugged honeycomb structure obtained was subjected to temperature confirmation test. The result is shown in Table 1.

TABLE 1

| | Chemical formula of metal silicide | Linear thermal expansion coefficient of pellets (° C.$^{-1}$) | Binder content (vol. %) | Si/binder (vol. %) | Silicide/binder (vol. %) | (Si + silicide)/binder (vol. %) | Open pore ratio (%) | Average pore diameter (μm) | Strength ratio | Temperature confirmation test (pass times/test times) |
|---|---|---|---|---|---|---|---|---|---|---|
| Ex. 1 | $TiSi_2$ | $6 \times 10^{-6}$ | 25 | 50 | 50 | 100 | 45 | 9 | 1.1 | 5/5 |
| Ex. 2 | $TiSi_2$ | $4 \times 10^{-6}$ | 5 | 50 | 50 | 100 | 45 | 9 | 1.3 | 5/5 |
| Ex. 3 | $TiSi_2$ | $5 \times 10^{-6}$ | 25 | 20 | 80 | 100 | 45 | 9 | 1.0 | 5/5 |
| Ex. 4 | $TiSi_2$ | $4 \times 10^{-6}$ | 25 | 80 | 20 | 100 | 45 | 9 | 1.3 | 5/5 |
| Ex. 5 | $MoSi_2$ | $4 \times 10^{-6}$ | 25 | 50 | 50 | 100 | 45 | 9 | 1.2 | 5/5 |
| Ex. 6 | $ZrSi_2$ | $5 \times 10^{-6}$ | 25 | 50 | 50 | 100 | 45 | 9 | 1.1 | 5/5 |
| Ex. 7 | $WSi_2$ | $4 \times 10^{-6}$ | 25 | 50 | 50 | 100 | 45 | 9 | 1.0 | 5/5 |
| Ex. 8 | $TiSi_2$ | $6 \times 10^{-6}$ | 60 | 50 | 50 | 100 | 37 | 9 | 1.1 | 5/5 |
| Ex. 9 | $TiSi_2$ | $5 \times 10^{-6}$ | 25 | 35 | 35 | 70 | 45 | 9 | 1.0 | 5/5 |
| Ex. 10 | $TiSi_2$ | $5 \times 10^{-6}$ | 25 | 34 | 34 | 68 | 45 | 9 | 1.0 | 4/5 |
| Ex. 11 | $TiSi_2$ | $5 \times 10^{-6}$ | 32 | 50 | 50 | 100 | 30 | 12 | 1.0 | 5/5 |
| Ex. 12 | $TiSi_2$ | $5 \times 10^{-6}$ | 40 | 50 | 50 | 100 | 75 | 8 | 1.2 | 5/5 |
| Ex. 13 | $TiSi_2$ | $5 \times 10^{-6}$ | 38 | 50 | 50 | 100 | 60 | 5 | 1.2 | 5/5 |
| Ex. 14 | $TiSi_2$ | $5 \times 10^{-6}$ | 20 | 50 | 50 | 100 | 34 | 50 | 1.1 | 5/5 |
| Comp. Ex. 1 | $TiSi_2$ | $6 \times 10^{-6}$ | 25 | 10 | 90 | 100 | 45 | 9 | 0.4 | 5/5 |
| Comp. Ex. 2 | $MoSi_2$ | $4 \times 10^{-6}$ | 25 | 10 | 90 | 100 | 45 | 9 | 0.6 | 5/5 |
| Comp. Ex. 3 | $ZrSi_2$ | $5 \times 10^{-6}$ | 25 | 10 | 90 | 100 | 45 | 9 | 0.5 | 5/5 |
| Comp. Ex. 4 | $WSi_2$ | $4 \times 10^{-6}$ | 25 | 10 | 90 | 100 | 45 | 9 | 0.4 | 5/5 |
| Comp. Ex. 5 | Not present (Si only) | $4 \times 10^{-6}$ | 25 | 100 | 0 | 100 | 45 | 9 | 1.1 | — |
| Comp. Ex. 6 | $TiSi_2$ | $4 \times 10^{-6}$ | 2 | 50 | 50 | 100 | — | — | — | — |
| Comp. Ex. 7 | $TiSi_2$ | $5 \times 10^{-6}$ | 90 | 50 | 50 | 100 | 28 | 4 | 1.1 | — |
| Comp. Ex. 8 | $TiSi_2$ | $4 \times 10^{-6}$ | 25 | 20 | 20 | 40 | 45 | 9 | 1.0 | 0/5 |

(Measurement of Thermal Expansion)

A test piece of 15 mm×3 mm×1 mm was cut out from pellets and measured for linear thermal expansion coefficient of 40 to 800° C. by a method based on JIS R 1618. The temperature elevation rate used was 10° C./min. The test equipment used was TMA-8310 (trade name) produced by Rigaku Denki Kogyosha.

(Component Ratio of Silicon Carbide Particles and Binder)

Pellets were ground and subjected to quantitative identification of components (silicon carbide particles and binder) by XRD measurement. The calibration curves for identification were prepared for each binder component (a reagent was used) using a SiC raw material powder as a standard. Specifically explaining, the SiC raw material powder and a binder component were mixed at volume ratios of 90:10, 75:25, 50:50, 25:75 and 10:90. Each mixture was ground to obtain each powder. Each powder was subjected to XRD measurement, whereby a calibration curve for the binder was prepared. The ratio of each binder component was quantitatively determined using the corresponding calibration curve and, in converting the ratio to a volume ratio, there was used the density of the powder used in calibration curve preparation, measured by a dry automatic densitometer (Accupyc 1330, produced by Shimadzu Corporation). In the XRD measurement, there was used RINT-2500 (trade name, produced by Rigaku Sha). Binder content (volume %) was calculated from "100×binder/(silicon carbide particles+binder)", and Si content (volume %) was calculated from "100×Si/binder".

(Open Pore Ratio)

A test piece of 10 mm×10 mm×1 mm was cut out from pellets and measured for open pore ratio by the Archimedes method. The measurement of open pore ratio was conducted for the pellets of each Example and each Comparative Example. Incidentally, the same value (open pore ratio) was obtained also for the honeycomb structures of each Example and each Comparative Example.

(Average Pore Diameter)

A test piece of 10 mm×10 mm×1 mm was cut out from pellets and measured for average pore diameter (pore diameter) using a mercury porosimeter. The measurement of average pore diameter was conducted for the pellets of each Example and each Comparative Example. Incidentally, the same value (average pore diameter) was obtained also for the honeycomb structures of each Example and each Comparative Example.

(Strength Test)

Pellets were subjected to 4-point bending strength test according to JIS R 1601. The strength test was conducted for the pellets before "heat cycle test" (explained below) and the pellets after the heat cycle test. The ratio of the strength of "the pellets after heat cycle test" to the strength of "the pellets before heat cycle test" was taken as strength ratio (strength ratio before and after heat cycle test). A strength ratio of 1.0 or more was taken as "pass", and a strength ratio of less than 1.0 was taken as "fail".

(Heat Cycle Test)

Pellets were processed in order to enable the strength test according to JIS R 1601, to obtain a test piece. The test piece was subjected to temperature elevation from room temperature at a rate of 100° C./min, kept in a box-shaped air furnace of 1,100° C. for 10 minutes, then cooled at a rate of 100° C./min, and allowed to stand at room temperature for 30 minutes; this cycle was repeated 20 times in total; and this was a heat cycle test. Incidentally, in Example 7 and Comparative Example 4, both containing $WSi_2$ in the binder phases, the heat cycle test was conducted in a nitrogen atmosphere using an electric furnace allowing for atmosphere control.

(Confirmation Test for Temperature Increase During Burning (Temperature Confirmation Test))

A ceramic-made, non-expanding mat (as a holding material) was wound round the outer surface of a plugged honeycomb structure (abbreviated as honeycomb structure). The mat-wound honeycomb structure was forced into a canning case made of SUS 409, to prepare a canned structure. Into the canned structure was introduced a particulate-containing combustion gas generated by combustion of a diesel gas oil; the combustion gas was allowed to enter from one end face (exhaust gas-incoming end face) of the honeycomb structure and discharge from the opposite end face (exhaust gas-leaving end face); thereby, particulate was captured inside the honeycomb structure. Then, the honeycomb structure was cooled to room temperature; thereafter, a combustion gas of 700° C. containing a certain proportion of oxygen was allowed to enter from the exhaust gas-incoming end face of the honeycomb structure to burn the soot, and the temperature of the center of the gas-leaving end face was measured using a thermocouple. The test was conducted 5 times for each plugged honeycomb structure. "Pass" evaluation was given to a case where temperature reduction could be confirmed as compared with the average maximum temperature (reference temperature) of the center of gas-leaving end face when Comparative Example 5 (the binder was silicon alone) was subjected to the temperature confirmation test. The times of pass in the 5 times test were examined.

Example 2

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 4 parts by mass of a metal Si powder and 2 parts by mass of a metal Ti powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 3

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 25 parts by mass of a metal Si powder and 17 parts by mass of a metal Ti powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 4

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 25 parts by mass of a metal Si powder and 4 parts by mass of a metal Ti powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 5

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 24 parts by mass of a metal Si powder and 21 parts by mass of a metal Mo powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 6

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 22 parts by mass of a metal Si powder and 16 parts by mass of a metal Zr powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 7

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 24 parts by mass of a metal Si powder and 38 parts by mass of a metal W powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 8

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 111 parts by mass of a metal Si powder and 48 parts by mass of a metal Ti powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 9

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 17 parts by mass of a metal Si powder, 7 parts by mass of a metal Ti powder and 7 parts by mass (as solid) of colloidal silica. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 10

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 16 parts by mass of a metal Si powder, 7 parts by mass of a metal Ti powder and 8 parts by mass (as solid) of colloidal silica. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 11

Pellets (a silicon carbide-based porous body) were obtained in the same manner as in Example 1 except that 100 parts by mass of a SiC powder (silicon carbide particles) consisting of 45 parts by mass of a SiC powder (silicon carbide particles) having an average particle diameter of 35 μm, 40 parts by mass of a SiC powder (silicon carbide particles) having an average particle diameter of 100 μm and 15 parts by mass of a SiC powder (silicon carbide particles) having an average particle diameter of 10 μm was mixed with 35 parts by mass of a metal Si powder and 15 parts by mass of a metal Ti powder and that the puddle obtained was subjected to pressing at a pressure of 200 kg/cm$^2$ using a mono-axial pressing machine. Separately, a plugged honeycomb structure was obtained in the same manner as in Example 1 except that 100 parts by mass of a SiC powder (silicon carbide particles) consisting of 45 parts by mass of a SiC powder (silicon carbide particles) having an average particle diameter of 35 μm, 40 parts by mass of a SiC powder (silicon carbide particles) having an average particle diameter of 100 μm and 15 parts by mass of a SiC powder (silicon carbide particles) having an average particle diameter of 10 μm was mixed with 35 parts by mass of a metal Si powder and 15 parts by mass of a metal Ti powder and that no pore former was used. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 12

Pellets (a silicon carbide-based porous body) were obtained in the same manner as in Example 1 except that 100 parts by mass of a SiC powder (silicon carbide particles) consisting of 20 parts by mass of a SiC powder (silicon carbide particles) having an average particle diameter of 35 μm, 70 parts by mass of a SiC powder (silicon carbide particles) having an average particle diameter of 10 μm and 10 parts by mass of a SiC powder (silicon carbide particles) having an average particle diameter of 5 μm was mixed with 49 parts by mass of a metal Si powder and 21 parts by mass of a metal Ti powder and that 10 parts by mass of a PMMA was added as a pore former. Separately, a plugged honeycomb structure was obtained in the same manner as in Example 1 except that 100 parts by mass of a SiC powder (silicon carbide particles) consisting of 20 parts by mass of a SiC powder (silicon carbide particles) having an average particle diameter of 35 μm, 70 parts by mass of a SiC powder (silicon carbide particles) having an average particle diameter of 10 μm and 10 parts by mass of a SiC powder (silicon carbide particles) having an average particle diameter of 5 μm was mixed with 49 parts by mass of a metal Si powder and 21 parts by mass of a metal Ti powder and that 25 parts by mass of starch and a foamed resin were added as a pore former. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 13

Pellets (a silicon carbide-based porous body) were obtained in the same manner as in Example 1 except that 100 parts by mass of a SiC powder (silicon carbide particles) consisting of 25 parts by mass of a SiC powder (silicon carbide particles) having an average particle diameter of 35 μm, 60 parts by mass of a SiC powder (silicon carbide particles) having an average particle diameter of 10 μm and 15 parts by mass of a SiC powder (silicon carbide particles) having an average particle diameter of 5 μm was mixed with 45 parts by mass of a metal Si powder and 20 parts by mass of a metal Ti powder and that the puddle obtained was subjected to pressing at a pressure of 200 kg/cm$^2$ using a mono-axial pressing machine. Separately, a plugged honeycomb structure was obtained in the same manner as in Example 1 except that 100 parts by mass of a SiC powder (silicon carbide particles) consisting of 25 parts by mass of a SiC powder (silicon carbide particles) having an average particle diameter of 35 μm, 60 parts by mass of a SiC powder (silicon carbide particles) having an average particle diameter of 10 μm and 15 parts by mass of a SiC powder (silicon carbide particles) having an average particle diameter of 5 μm was mixed with 45 parts by mass of a metal Si powder and 20 parts by mass of a metal Ti powder and that no pore former was used. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Example 14

Pellets (a silicon carbide-based porous body) were obtained in the same manner as in Example 1 except that 100 parts by mass of a SiC powder (silicon carbide particles) consisting of 10 parts by mass of a SiC powder (silicon carbide particles) having an average particle diameter of 35 μm and 90 parts by mass of a SiC powder (silicon carbide particles) having an average particle diameter of 100 μm was mixed with 19 parts by mass of a metal Si powder and 8 parts by mass of a metal Ti powder and that 5 parts by mass of a PMMA was added as a pore former. Separately, a plugged honeycomb structure was obtained in the same manner as in Example 1 except that 100 parts by mass of a SiC powder (silicon carbide particles) consisting of 10 parts by mass of a SiC powder (silicon carbide particles) having an average particle diameter of 35 μm and 90 parts by mass of a SiC powder (silicon carbide particles) having an average particle diameter of 100 μm was mixed with 19 parts by mass of a metal Si powder and 8 parts by mass of a metal Ti powder and that 20 parts by mass of starch and a foamed resin were added as a pore former. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Comparative Example 1

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 25 parts by mass of a metal Si powder and 19 parts by mass of a metal Ti powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Comparative Example 2

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 24 parts by mass of a metal Si powder and 37 parts by mass of a metal Mo powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the plugged honeycomb structure was subjected to temperature confirmation test. The result is shown in Table 1.

Comparative Example 3

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 20 parts by mass of a metal Si powder and 29 parts by mass of a metal Zr powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Comparative Example 4

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 23 parts by mass of a metal Si powder and 68 parts by mass of a metal W powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Comparative Example 5

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 24 parts by mass of a metal Si powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

Comparative Example 6

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 1 part by mass of a metal Si powder and 1 part by mass of a metal Ti powder. Incidentally, in Comparative Example 6, since the amount of binder was small at 2% by volume and the strength after firing was low, the pellets and the honeycomb structure caused disintegration, making impossible the measurements of various properties.

Comparative Example 7

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 637 parts by mass of a metal Si powder and 568 parts by mass of a metal Ti powder. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The results are shown in Table 1. Incidentally, in Comparative Example 7, since the pore diameter and open pore ratio of the plugged honeycomb structure were small and the pressure loss was large, there was no complete burning of soot in the temperature confirmation test and, therefore, no data could be obtained in the temperature confirmation test.

Comparative Example 8

Pellets (a silicon carbide-based porous body) and a plugged honeycomb structure were obtained in the same manner as in Example 1 except that 100 parts by mass of a SiC powder (silicon carbide particles) having an average particle diameter of 35 μm was mixed with 9 parts by mass of a metal Si powder, 4 parts by mass of a metal Ti powder and 15 parts by mass (as solid) of colloidal silica. The pellets were measured, in the same manner as in Example 1, for strength ratio, component ratio of silicon carbide particles and binder, open pore ratio and average pore diameter. The results obtained are shown in Table 1. There were also measured the linear thermal expansion coefficients of 40 to 800° C., of the Si phase and metal silicide phase constituting the obtained pellets (silicon carbide-based porous body). The plugged honeycomb structure was subjected to temperature confirmation test. The result is shown in Table 1.

The followings are clear from Examples 1 to 14 and Comparative Example 1 to 8. When the phase of the binding phases, having the largest volume is either of a Si phase and a metal silicide phase and the phase having the next largest volume is the remainder of the Si phase and the metal silicide phase, and the binding phases contain the Si phase by 20 to 80% by volume of the total binding phases, the strength reduction caused by heat cycle can be prevented.

The silicon carbide-based porous body of the present invention can be suitably used as a filter for capturing and removing the particulate matter present in exhaust gases of automobile, etc.

What is claimed is:
1. A silicon carbide-containing porous body comprising a plurality of silicon carbide (SiC) particles as an aggregate and a plurality of binding phases comprising a crystal phase having the largest volume and a crystal phase having the second largest volume, which bind the silicon carbide particles to each other, wherein
of the binding phases, the crystal phase having the largest volume is either one of
a Si phase, or
a metal silicide phase made of at least one member selected from the group consisting of a Ti silicide, a Zr silicide, a Mo silicide and a W silicide, all having a linear thermal expansion coefficient at 40 to 800° C., higher than that of Si by at least $3 \times 10\text{-}6$ (° C.$^{-1}$), the crystal phase having the second largest volume is the other of
- the Si phase, or
- the metal silicide phase made of at least one member selected from the group consisting of a Ti silicide, a Zr silicide, a Mo silicide and a W silicide, all having a linear thermal expansion coefficient at 40 to 800° C., higher than that of Si by at least $3 \times 10\text{-}6$ (° C.$^{-1}$), the content of the binder constituting the binding phases, which is calculated by the following formula:

100×binder/(silicon carbide particles+binder)

is 5 to 60% by volume, and
the binding phases contain the Si phase by 20 to 80% by volume of the total binding phases, and the metal silicide phase by 20 to 80% by volume of the total binding phases.

2. A silicon carbide-containing porous body according to claim 1, having an open pore ratio of 30 to 75%.

3. A silicon carbide-containing porous body according to claim 2, having an average pore diameter of 5 to 50 μm.

4. A silicon carbide-containing porous body according to claim 2, wherein the silicon carbide particles have an average particle diameter of 5 to 100 μm.

5. A silicon carbide-containing porous body according to claim 2, wherein the total volume of the Si phase and the metal silicide phase made of at least one member selected from the group consisting of a Ti silicide, a Zr silicide, a Mo silicide and a W silicide, all having a linear thermal expansion coefficient at 40 to 800° C., higher than that of Si by at least $3 \times 10^{-6}$ (° C.$^{-1}$) is 70% by volume or more, of the total binding phases.

6. A silicon carbide-containing porous body according to claim 2, which is a honeycomb structure having porous partition walls and a plurality of cells.

7. A silicon carbide-containing porous body according to claim 1, having an average pore diameter of 5 to 50 μm.

8. A silicon carbide-containing porous body according to claim 7, wherein the silicon carbide particles have an average particle diameter of 5 to 100 μm.

9. A silicon carbide-containing porous body according to claim 7, wherein the total volume of the Si phase and the metal silicide phase made of at least one member selected from the group consisting of a Ti silicide, a Zr silicide, a Mo silicide and a W silicide, all having a linear thermal expansion coefficient at 40 to 800° C., higher than that of Si by at least $3 \times 10^6$ (° C.$^{-1}$) is 70% by volume or more, of the total binding phases.

10. A silicon carbide-containing porous body according to claim 7, which is a honeycomb structure having porous partition walls and a plurality of cells.

11. A silicon carbide-containing porous body according to claim 1, wherein the silicon carbide particles have an average particle diameter of 5 to 100 μm.

12. A silicon carbide-containing porous body according to claim 11, wherein the total volume of the Si phase and the metal silicide phase made of at least one member selected from the group consisting of a Ti silicide, a Zr silicide, a Mo silicide and a W silicide, all having a linear thermal expansion coefficient at 40 to 800° C., higher than that of Si by at least $3 \times 10^{-6}$ (° C.$^{-1}$) is 70% by volume or more, of the total binding phases.

13. A silicon carbide-containing porous body according to claim 11, which is a honeycomb structure having porous partition walls and a plurality of cells.

14. A silicon carbide-containing porous body according to claim 1, wherein the total volume of the Si phase and the metal silicide phase made of at least one member selected from the group consisting of a Ti silicide, a Zr silicide, a Mo silicide and a W silicide, all having a linear thermal expansion coefficient at 40 to 800° C., higher than that of Si by at least $3 \times 10^{-6}$ (° C.$^{-1}$) is 70% by volume or more, of the total binding phases.

15. A silicon carbide-containing porous body according to claim 14, which is a honeycomb structure having porous partition walls and a plurality of cells.

16. A silicon carbide-containing porous body according to claim 1, which is a honeycomb structure having porous partition walls and a plurality of cells.

17. A method for producing a silicon carbide-containing porous body, which comprises
kneading a raw material to be formed, to prepare a puddle, the raw material to be formed containing silicon carbide particles, a binder raw material and a pore former, the binder raw material containing a metal silicide raw material, the metal silicide raw material being (a) a mixture of a silicon powder and at least one member selected from the group consisting of Ti, Zr, Mo and W, (b) at least one member selected from the group consisting of a Ti silicide, a Zr silicide, a Mo silicide and a W silicide, or (c) a mixture of (a) and (b), the content of the binder raw material, which is calculated by the following formula:

100×binder raw material/(silicon carbide particles+ binder raw material)

is 5 to 70% by volume, and the content of the pore former, which is calculated by the following formula:

100×pore former/(raw material to be formed)

is 25 to 85% by volume,
forming the puddle to prepare a formed material, and
firing the formed material to obtain a silicon carbide-based porous body having binding phases including a crystal phase having the largest volume and a crystal phase having the second largest volume, wherein
of the binding phases formed by the firing, the crystal phase having the largest volume is either one of
- a Si phase, or
- a metal silicide phase made of at least one member selected from the group consisting of a Ti silicide, a Zr silicide, a Mo silicide and a W silicide, all having a linear thermal expansion coefficient at 40 to 800° C., higher than that of Si by at least $3 \times 10^{-6}$ (° C.$^{-1}$), the crystal phase having the second largest volume is the other of
- the Si phase, or
- the metal silicide phase made of at least one member selected from the group consisting of a Ti silicide, a Zr silicide, a Mo silicide and a W silicide, all having a linear thermal expansion coefficient at 40 to 800° C., higher than that of Si by at least $3 \times 10^{-6}$ (° C.$^{-1}$), the content of the binder constituting the binding phases, which is calculated by the following formula:

100×binder/(silicon carbide particles+binder)

is 5 to 60% by volume, and
the binding phases contain the Si phase by 20 to 80% by volume of the total binding phases, and the metal silicide phase by 20 to 80% by volume of the total binding phases.

* * * * *